United States Patent [19]

Curtis et al.

[11] 4,177,949

[45] Dec. 11, 1979

[54] FOG GENERATING APPARATUS

[75] Inventors: Russell R. Curtis, Indianapolis; Albert L. Schlensker, Westfield, both of Ind.

[73] Assignee: Curtis Dyna Products Corporation, Westfield, Ind.

[21] Appl. No.: 907,882

[22] Filed: May 19, 1978

[51] Int. Cl.² .............................................. B05B 1/30
[52] U.S. Cl. .................................. 239/582; 251/253; 251/351
[58] Field of Search ............................. 239/581, 582; 251/252–254, 263, 346, 348, 351, 353

[56] References Cited

U.S. PATENT DOCUMENTS

| 1,423,418 | 7/1922 | Grikscheit | 251/346 |
| 2,705,171 | 3/1955 | Ziherl | 239/399 |
| 3,476,144 | 11/1969 | Krantz | 251/346 X |

FOREIGN PATENT DOCUMENTS

| 2201640 | 7/1973 | Fed. Rep. of Germany | 251/351 |
| 102094 | 11/1923 | Switzerland | 251/254 |

Primary Examiner—Robert W. Saifer
Attorney, Agent, or Firm—Woodard, Weikart, Emhardt & Naughton

[57] ABSTRACT

Disclosed is a fog generating apparatus having adjustable metering valve in which the liquid atomized at the nozzle of the apparatus is drawn past a valve opening of adjustable size and flows through the cooperating valve stem to a conduit leading to the atomizing nozzle.

4 Claims, 9 Drawing Figures

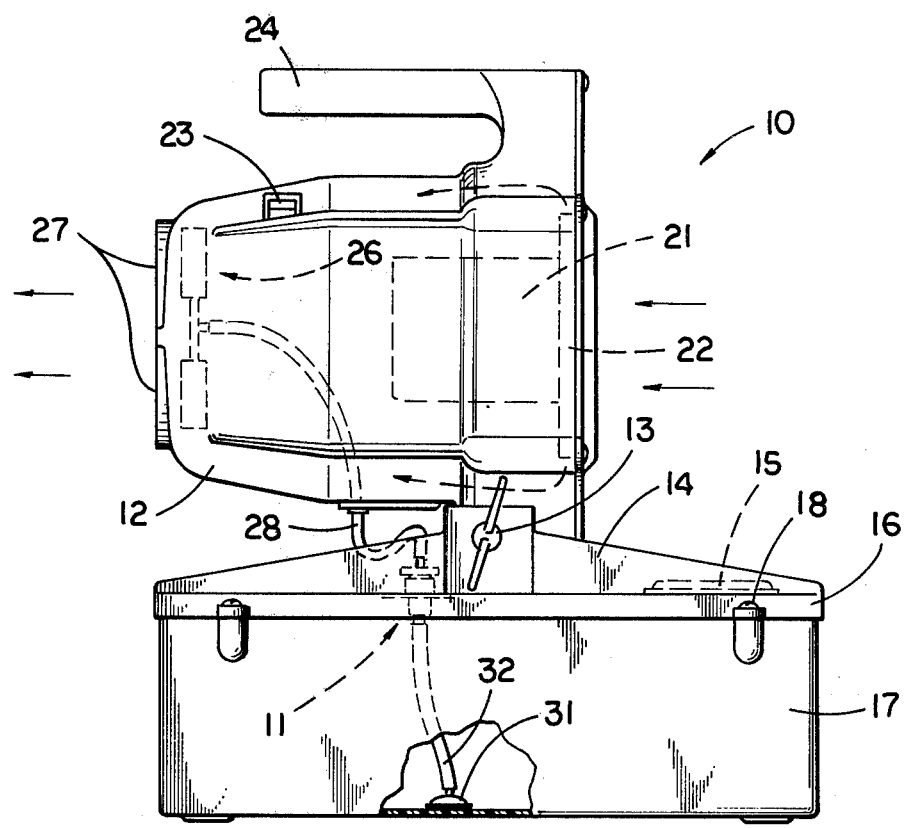
FIG. 1
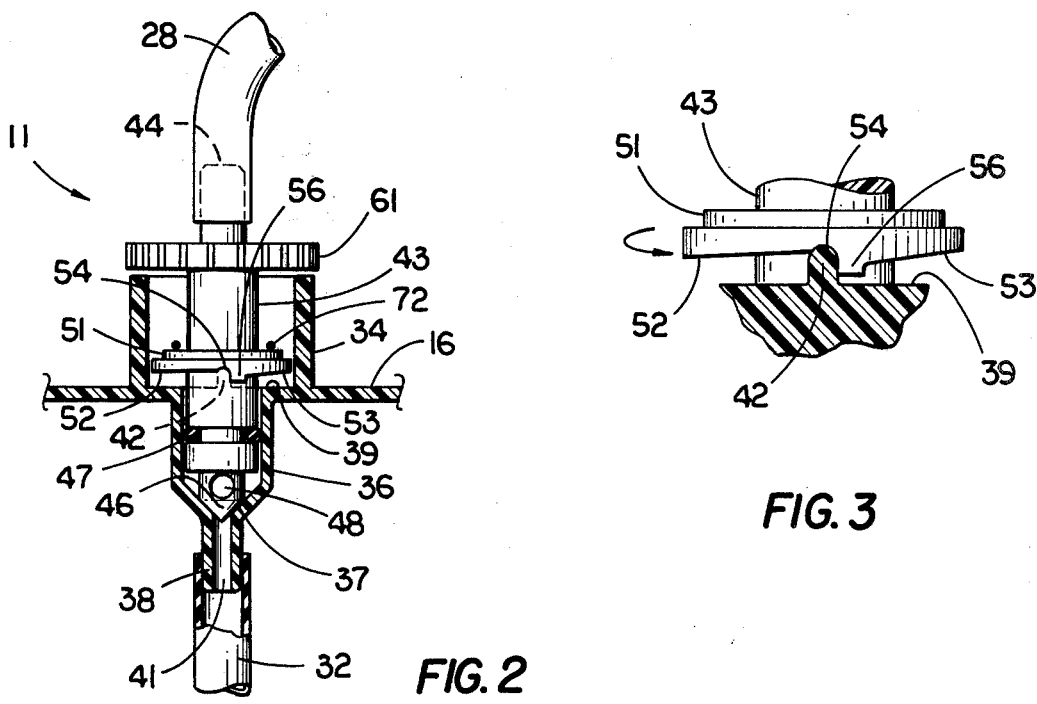
FIG. 2
FIG. 3

FOG GENERATING APPARATUS

BACKGROUND OF THE INVENTION

Fog generating devices of the type described herein are disclosed in U.S. Pat. No. 2,705,171 and 3,633,825. These devices are used to provide a fog formed of droplets of germicide solution, insecticides, deodorants, etc. in enclosed areas, such as hospital rooms or the like. Since the efficiency of the solution dispensed often depends upon accurate control of the volume of material expelled in a given time interval, accurate, low-cost and trouble-free metering valves for these devices are of primary importance.

The fog generating device described herein utilizes a manually adjustable metering valve in which the valve stem itself has a control bore through which fluid flows after passing the metering valve. The valve stem component, preferably molded of a suitable thermoplastic material, incorporates the adjustment wheel, stem and adjustment means as a one-piece unit. The range of movement of the adjusting wheel, from maximum open to closed condition of the metering valve is relatively lengthy compared to the relatively short range of motion of the valve and the desired adjustment may thus be easily and accurately made. In one of the valve forms a U-shaped resilient wire spring provides a slight counterforce on the valve stem and, because of its contour, retains itself in place in the valve assembly but is accessible from the exterior of the valve assembly for removal when necessary.

BRIEF DESCRIPTION OF THE DRAWINGS

FIG. 1 is a side view of a fog generating apparatus embodying the present invention.

FIG. 2 is an enlarged side sectional view of the metering valve component of the apparatus shown in FIG. 1.

FIG. 3 is a fragmentary, enlarged side view of the valve stem cam shown in FIG. 2.

DESCRIPTION OF THE PREFERRED EMBODIMENTS

Figure 4:
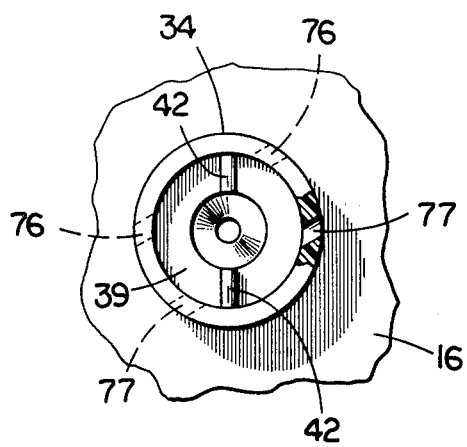
FIG. 4 is a top plan view of the valve housing shown in FIG. 2 but with the valve stem component removed.

Referring initially to FIG. 1, there is shown a fog generating apparatus 10 incorporating the metering valve, generally indicated at 11, of the present invention. Except for metering valve 11, the apparatus shown in FIG. 1 is generally similar to that disclosed in U.S. Pat. No. 2,705,171. The apparatus includes a tiltable upper housing 12 pivotally mounted by means of clamping pin 13 to flanges 14 extending from the cover portion 16 of a reservoir tank 17 for insecticide liquid, for example. The tank is provided with a removable fill cap 15. The cover of the tank is removably secured to the tank body by means of threaded fasteners 18.

Within the upper housing there is mounted an electric motor 21 which drives a centrifugal fan wheel 22, the adjacent end of the housing being perforated or louvered to provide an air inlet for the fan. A switch 23, conveniently accessible to the handle 24, controls operation of the motor. The interior of housing 12 is shaped so as to direct air into the liquid atomizing means 26 mounted in the housing at the multiple outlet nozzles 27. The atomizing means, as in U.S. Pat. No. 2,705,171 previously mentioned, is formed by air directing swirl members and the liquid, drawn by the aspirating effect of the air movement from tank 17 through tube or hose 28, is introduced by means of a header passage into all of the nozzles 27. The nozzles include knife edged tubes from which liquid in the tubes is torn by the relatively high velocity air to provide the atomizing effect. The atomizing effect is described, in general, in U.S. Pat. No. 3,521,817 and, it will be understood, the atomizing means, itself, forms no part of the present invention. The liquid drawn from the tank 17 moves through the strainer foot 13 near the base of the tank, through flexible tube 32, through metering valve 11 and through tube 28 to the atomizing means 26. A finely divided fog made up of droplets of the liquid is thus caused to issue from the multiple nozzles 27, as indicated by arrows in FIG. 1.

The metering valve itself will now be described in detail with reference to FIGS. 2–5. The valve includes a cylindrical valve body having a large diameter sidewall 34 and a reduced diameter sidewall 36, the lower portion of which is cone-shaped to form a valve seat 37. Below the valve seat the valve body has an extending portion 38 which accomodates the hose 32. A band clamp (not shown) may be used to clamp the hose on the body portion 38. The larger diameter portion of the housing is separated from the smaller diameter portion by a transverse shoulder or surface 39 which may be an integral part of the cover 16 as shown in FIG. 2, or, alternatively, could be a separate, centrally apertured disc. The central, longitudinal bore of the housing terminates, at its lower end, with an inlet aperture 41. The surface 39 is provided with two diametrically opposite abutments or bosses 42 (FIG. 4).

Received within the central bore of the housing is a valve stem 43. The stem is hollow and, at its upper end, the central bore of the stem terminates at an outlet aperture 44 in the reduced end portion of the stem. This reduced end portion has clamped to it, by any suitable means, the adjacent end of the hose 28. The lower end 46 of the valve stem is cone-shaped and closes against the conical valve seat 37. An O-ring 47 provides a dynamic seal between the valve stem and the housing bore. The central passage through the valve stem communicates with a transverse passage 48 through the stem so that with the conical portion of the stem lifted off the conical seat 37, liquid may move past the valve seat, through passage 48 and to the outlet aperture 44.

The stem 43 is also provided with an annular flange 51 adjacent the shoulder 39 and this flange carries two identical cam surfaces 52 and 53 (FIGS. 2 and 3). Each camming surface extends for approximately 180° of the total surface and varies uniformly from a minimum to a maximum thickness over its length. A small detent indentation and a stop abutment define the junctional area between the two cam surfaces, one of the detent recesses 54 and one of the stop abutments 56 being visible in FIGS. 2 and 3. As may be seen in FIGS. 3 and 4, one of the abutments 42 rides on each of the cam surfaces 52 and 53 and, as the stem 43 is rotated, this camming action shifts the vertical position of the valve stem, moving the conical valve surface 46 toward and away from the valve seat 37. As shown in FIGS. 2 and 3, the abutments 42 are seated in the detent notches 54 and the valve portion 46 is closed against the valve seat 37. Rotation of the stem by means of the serrated adjusting wheel 61 carried by the stem, in the direction indicated in FIG. 3, will lift the valve stem away from seat 37 permitting liquid to flow through the valve. The amount of opening motion of the valve stem will be a direct function of the distance through which wheel 61, and thus stem 43, are rotated.

Figure 5:
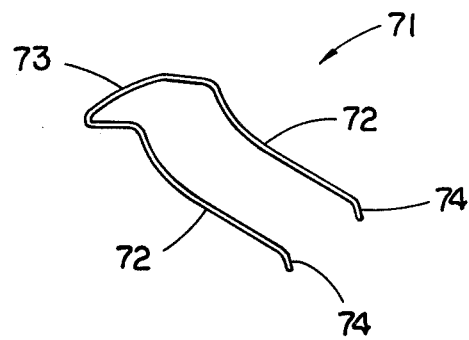
FIG. 5 is a perspective view of the valve spring shown in FIG. 2.
Figure 6:
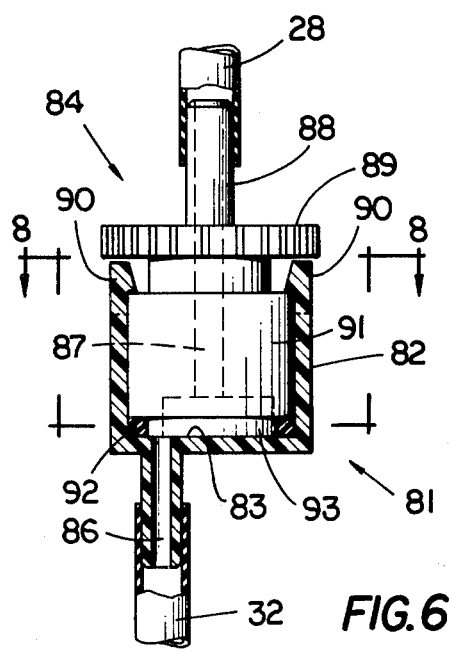
FIG. 6 is an enlarged side sectional view similar to FIG. 2 but showing a modified form of the valve assembly.
Figure 7:
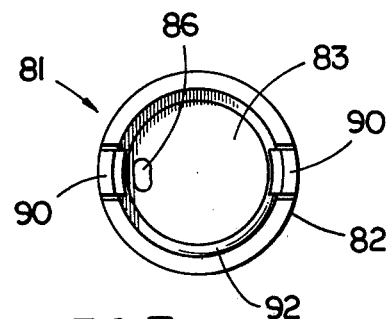
FIG. 7 is a top plan view of the valve housing shown in FIG. 6 but with the valve stem component removed.
Figure 8:
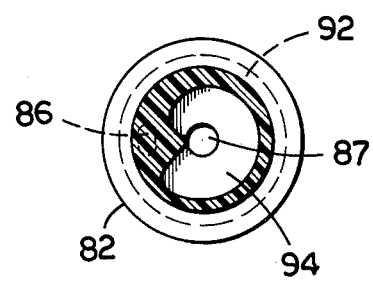
FIG. 8 is a top view, partially in section taken generally along the line 8—8 of FIG. 6 and showing the metering valve in closed position.
Figure 9:
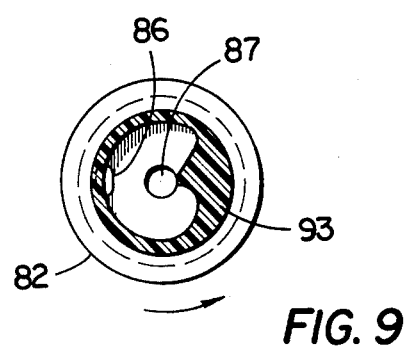
FIG. 9 is a view similar to FIG. 8 but showing the valve between closed and full open positions.

A means is provided for holding the stem in the valve body and for urging each of the cam surfaces 52 and 53 against its respective abutment 42. This means is shown in FIG. 5 and takes the form of a generally U-shaped wire spring 71 whose central portions 72 are curved out of the plane of its closed end 73 and whose free ends 74 are formed to project downwardly. As may best be seen in FIG. 4, the wall portion 34 of the housing is provided chordally opposite, transverse apertures 76 and 77. These apertures receive the legs of the member 71, the portions 74 of the legs extending downwardly adjacent the exterior surface of the housing sidewall portion 34 and the portion 73 spanning the distance between apertures 76 and 77 adjacent the opposite exterior surface of sidewall 34. When the member 71 is thus in place, the central portions 72 of member 71 will be forced upwardly, resiliently distorting member 71, and, as will be evident from FIG. 2, the portions 72 will bear against the upper surface of flange 51 urging the cam surfaces 52 and 53 into engagement with the abutments 42. The resilient deformation of member 71 also locks the leg tips 74 in the apertures 76 and 77.

In operation, with motor 21 energized, the air moving through the atomizing means will draw liquid from the tank 71, through metering valve 11, to the nozzles 27 from which the liquid, now atomized to fine droplets, issues as a mist or fog. The flow of liquid will be accurately determined by the setting, accomplished by positioning wheel 61, of the valve 11.

Referring to FIGS. 6–9 a modified form of the metering valve is shown. The modified form of the metering valve includes a valve body 81 having a cup-shaped configuration, tubular sidewall 82 and base 83 providing a central cavity which receives, in nested relation, the valve stem component 84. An inlet aperture 86, of generally oval configuration is formed in the base 83 adjacent one of its side margins. The base of the valve body, at inlet aperture 86, is elongated to accomodate the flexible tube 32 communicating with the reservoir tank.

The valve stem 84 has a central, longitudinal bore 87 which defines an outlet aperture and the upper end 88 of the stem is of reduced diameter to accomodate the hose 28 which communicates with the atomizing means 26. The valve stem carries a serrated adjusting wheel 89 for manually adjusting the rotational or angular position of the valve stem about its central, longitudinal axis. The stem is clamped within the valve body by integral, somewhat resilient abutments 90 which extend beyond the end of portion 82 of the valve body and hook over the upper margin of stem portion 91. The enlarged diameter portion 91 of the valve stem can be rotated within the central cavity of the valve body and, adjacent the lower end of the stem, an O-ring 92 on the valve body cooperates with an inset portion 93 on the valve stem to provide a sealing, support surface for the stem. The lower end surface of the stem portion 93 engages the surface of the base wall 83 of the housing and has an incised or intaglio area 94 (FIG. 8). The intaglio area is shaped so as to intersect the central bore 87 of the stem and to have an increasing radius vector measured from the central axis of the stem bore 87.

As shown in FIG. 8, the portion of the end surface 93 adjacent the minimum radius of the intaglio portion 94, that is, the portion of end surface 93 which is not incised, overlies and closes the inlet aperture 86 when the stem is in the rotative position of FIG. 8, this defining the closed position of the valve. A stop (not shown as viewed in FIG. 8) may be provided to limit clockwise rotation of the stem at this position.

To adjust the size of the area of aperture 86 which is uncovered by the intaglio portion 94, and hence the flow through the valve, the stem may be rotated (counterclockwise as viewed in FIG. 9), by means of wheel 89, to, for example, the position of FIG. 9. As the intaglio portion is rotated an increasing area of inlet aperture 86 is uncovered, the maximum open position occurring when the intaglio area of maximum radius vector registers with the inlet aperture. This arrangement permits a very accurate adjustment of the flow through the valve since the motion range from closed to full open of the valve is spread over almost 360° of rotation of the adjustment wheel 89. Operation of this form of the valve in cooperation with the remainder of the apparatus is the same as that described with reference to FIGS. 1–5.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An adjustable metering valve for a fog generating apparatus of the type in which an electric motor-driven fan provides aspirating air movement drawing liquid at a relatively low flow rate from an adjacent liquid reservoir and delivering it to an atomizing means, said adjustable metering valve being adapted to control the flow of liquid from said reservoir to said atomizing means, said metering valve comprising a valve body having a central longitudinal bore with an inlet aperture at one end, a valve seat formed in said body adjacent the intake end of said bore and an annular transverse shoulder formed in said body encircling said bore and spaced from said inlet aperture, a hollow valve stem received within said bore and extending beyond said housing at one of its ends and cooperating with said valve seat at its other end, a transverse passage in said valve stem upstream of said valve seat and communicating with the interior of the valve stem, an annular flange on said valve stem adjacent said shoulder, cooperating cam elements on said shoulder and said stem flange comprising two camming surfaces each extending for approximately 180° of the flange surface and varying uniformly from a minimum to a maximum thickness in said approximate 180° extension, and two diametrically opposite abutments each engaging one of said cam surfaces, said cam elements being operative to axially displace said valve stem with relation to said valve seat between full closed and full open positions upon approximately 180° of rotation of said stem, and a member carried by the portion of said stem exterior of the housing for facilitating manual adjusting rotation of said stem within the housing.

2. An adjustable metering valve for a fog generating apparatus of the type in which an electric motor-driven fan provides aspirating air movement drawing liquid at a relatively low flow rate from an adjacent liquid reservoir and delivering it to an atomizing means, said adjustable metering valve being adapted to control the flow of liquid from said reservoir to said atomizing means, said metering valve comprising a valve body having a central longitudinal bore with an inlet aperture at one end, a valve seat formed in said body adjacent the intake end of said bore and an annular transverse shoulder formed in said body encircling said bore and spaced from said inlet aperture, a hollow valve stem received within said bore and extending beyond said housing at one of its ends and cooperating with said valve seat at its other end, a transverse passage in said valve stem upstream of said valve seat and communicating with the interior of the valve stem, an annular flange on said valve stem adjacent said shoulder, cooperating cam elements on said shoulder and said stem flange operative to axially displace said valve stem with relation to said valve seat between full closed and full open positions upon approximately 180° of rotation of said stem, a member carried by the portion of said stem exterior of the housing for facilitating manual adjusting rotation of said stem within the housing, and a resilient member extending through chordally opposite transverse apertures in said housing, placement of said resilient member in said apertures resiliently deforming said member so that it is retained in the apertures and exerts a force on said stem flange urging it toward said body shoulder.

3. An adjustable metering valve as claimed in claim 2 in which said resilient member takes the form of a generally U-shaped wire whose legs extend through said chordally opposite housing apertures and straddle the central longitudinal axis of said valve stem.

4. An adjustable metering valve as claimed in claim 2 in which said cam elements comprise two camming surfaces on the face of said stem flange adjacent said body shoulder, each camming surface extending for approximately 180° of the flange surface and varying uniformly from a minimum to a maximum thickness in said approximate 180° extension, and two diametrically opposite abutments on said body shoulder each engaging one of said cam surfaces.

* * * * *